(12) United States Patent
Tomizawa et al.

(10) Patent No.: US 7,967,372 B2
(45) Date of Patent: Jun. 28, 2011

(54) SOUND-INSULATION STRUCTURE FOR CAB-OVER TRUCK

(75) Inventors: Tatsuya Tomizawa, Kanagawa (JP); Naoko Saji, Kanagawa (JP); Kenji Fujimori, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 215 days.

(21) Appl. No.: 12/516,446

(22) PCT Filed: Nov. 27, 2007

(86) PCT No.: PCT/JP2007/072861
§ 371 (c)(1),
(2), (4) Date: Jun. 4, 2009

(87) PCT Pub. No.: WO2008/066042
PCT Pub. Date: Jun. 5, 2008

(65) Prior Publication Data
US 2010/0060032 A1  Mar. 11, 2010

(30) Foreign Application Priority Data
Nov. 27, 2006  (JP) .................................. 2006-319196

(51) Int. Cl.
*B62D 33/067* (2006.01)
(52) U.S. Cl. ................ 296/190.05; 296/39.3; 180/89.14
(58) Field of Classification Search ............. 296/190.03, 296/190.04, 190.05, 190.06, 190.08, 39.3; 180/89.14, 89.15
See application file for complete search history.

(56) References Cited

U.S. PATENT DOCUMENTS
4,440,437 A * 4/1984 Hahm et al. ............. 296/190.05

FOREIGN PATENT DOCUMENTS
| JP | 4-119284 A | 10/1992 |
| JP | H4-119284 U | 10/1992 |
| JP | 08-225021 A | 9/1996 |
| JP | 2003-220900 A | 8/2003 |

* cited by examiner

*Primary Examiner* — Joseph D Pape

(57) ABSTRACT

A cab-side cover 10 is fixed to a cab 1, and a chassis-side cover 13 is fixed to a side member 2. A rear edge portion 7a of a tilt stay 7 is located between a front tire 5 and the side member 2 while the cab 1 is in a non-tilted state. The cab-side cover 10 includes a cab-side front cover portion 12, and the chassis-side cover 13 includes a chassis-side front cover portion 15. The cab-side front cover portion 12 is located at the outer side, in the vehicle-width direction, of the tilt stay 7 and extends further forward than the rear edge portion 7a of the tilt stay 7 while the cab 1 is in the non-tilted state. The chassis-side front cover portion 15 is located at the inner side, in the vehicle-width direction, of the tilt stay 7 and extends further forward and downward than the front lower edge of the cab-side front cover portion 12 while the cab 1 is in the non-tilted state.

1 Claim, 5 Drawing Sheets

SOUND-INSULATION STRUCTURE FOR CAB-OVER TRUCK

CROSS REFERENCE TO RELATED APPLICATIONS

This application is a National Stage of International Application No. PCT/JP2007/072861 filed Nov. 27, 2007, claiming priority based on Japanese Patent Application No. 2006-319196, filed Nov. 27, 2006, the contents of all of which are incorporated herein by reference in their entirety.

TECHNICAL FIELD

The present invention relates to a sound-insulation structure for a cab-over truck including a cab capable of being tilted.

BACKGROUND ART

As a sound-insulation structure for blocking an engine sound leaking outside the vehicle through a gap between a cab and a chassis frame, JP-A 2003-220900 discloses a structure provided with a sealing member which elastically deforms between a cab and a chassis frame while the cab is in a non-tilted state.

Patent Document 1: JP-A 2003-220900

DISCLOSURE OF THE INVENTION

Problems to be Solved by the Invention

Another conceivable structure exhibiting the effect of blocking an engine sound includes a structure in which a cab-side cover is fixed to a cab and a chassis-side cover is fixed to a chassis frame, and an engine room is covered with these covers from the outer side thereof in the vehicle-width direction while the cab is not being tilted.

However, the cab-side cover and the chassis-side cover need to be arranged in such a manner as not to interfere with each other and not to interfere with a front tire being steered. For this reason, for example, if a rear edge portion of a tilt stay during the cab not being tilted is located between a front tire and a chassis frame, it is difficult to cover a region located in the front vicinity of the rear edge portion of the tilt stay from the outer side of the tilt stay in the vehicle-width direction. Accordingly, sufficient sound-insulating performance may not be obtained.

Thus, an object of the present invention is to provide a sound-insulation structure capable of sufficiently insulating an engine sound even when a rear edge portion of a tilt stay during a cab not being tilted is located between a front tire and a chassis frame.

Means for Solving the Problems

To solve the above-mentioned problem, a sound-insulation structure of the present invention includes a chassis frame, a front tire, a cab, a tilt stay, an engine room, a cab-side cover and a chassis-side cover. The chassis frame extends in a front-to-rear direction of a vehicle. The front tire is arranged at an outer side, in a vehicle-width direction, of the chassis frame. The cab is capable of being set to a non-tilted state where a front edge side and a different edge side thereof are supported by the chassis frame, and to a tilted state where the different edge side is rotated and moved upward about the front edge side. The tilt stay keeps the cab in the tilted state. The engine room is arranged at an inner side, in the vehicle-width direction, of the chassis frame and at a lower side of the cab in the non-tilted state. The cab-side cover is fixed to the cab. The chassis-side cover is fixed to the chassis frame. A rear edge portion of the tilt stay is located between the front tire and the chassis frame while the cab is in the non-tilted state.

The cab-side cover includes a cab-side front cover portion, and the chassis-side cover includes a chassis-side front cover portion. The cab-side front cover portion is located at an outer side, in the vehicle-width direction, of the tilt stay and extends further forward than the rear edge portion of the tilt stay while the cab is in the non-tilted state. The chassis-side front cover portion is located at an inner side, in the vehicle-width direction, of the tilt stay and extends further forward and downward than a front lower edge of the cab-side front cover portion while the cab is in the non-tilted state.

In the above-described structure, while the cab is not being tilted, the cab-side front cover portion is located at the front side and at the outer side, in the vehicle-width direction, of the rear edge portion of the tilt stay. Thus, the lower edge fringe of the cab-side front cover portion needs to be set at a height at which the cab-side front cover portion will not interfere with the steering range of the front tire in a state where the cab is located at its lowermost position due to the actuation of a suspension mechanism. By contrast, the chassis-side front cover portion is located at the inner side, in the vehicle-width direction, of the tilt stay. The position, in the vehicle-width direction, of the tilt stay is set so that the tilt stay may not interfere with the steering range of the front tire. Accordingly, interference with the front tire does not need to be considered for the chassis-side front cover portion. In other words, a position of the lower fringe of the cab-side front cover portion is restricted by the steering angle of the front tire, while a position of the lower fringe of the chassis-side front cover portion is not restricted by the steering angle of the front tire.

Hence, the cab-side front cover portion can be extended downward as long as its position (height) will not interfere with the steering range of the front tire. Further, the chassis-side front cover portion can be extended forward as long as its position (front position and height) will not interfere with other in-vehicle parts. Thus, in a region located in the front vicinity of the rear edge portion of the tilt stay during the cab not being tilted, a portion where the cab-side front cover portion and the chassis-side front cover portion overlap each other in the vehicle-width direction can be doubly covered with these cover portions from the vehicle-width direction; and a portion located further forward and downward than the front lower edge of the cab-side front cover portion can be covered with the chassis-side front cover portion from the outer side thereof in the vehicle-width direction. In essence, the region located in the front vicinity of the rear edge portion of the tilt stay during the cab not being tilted can be covered with the cab-side front cover portion and the chassis-side front cover portion from the outer side thereof in the vehicle-width direction. Thereby, an engine sound can be sufficiently blocked.

Effects of the Invention

According to the present invention, an engine sound can be sufficiently blocked even when a rear edge portion of a tilt stay during a cab not being tilted is located between a front tire and a chassis frame.

Figure 1:
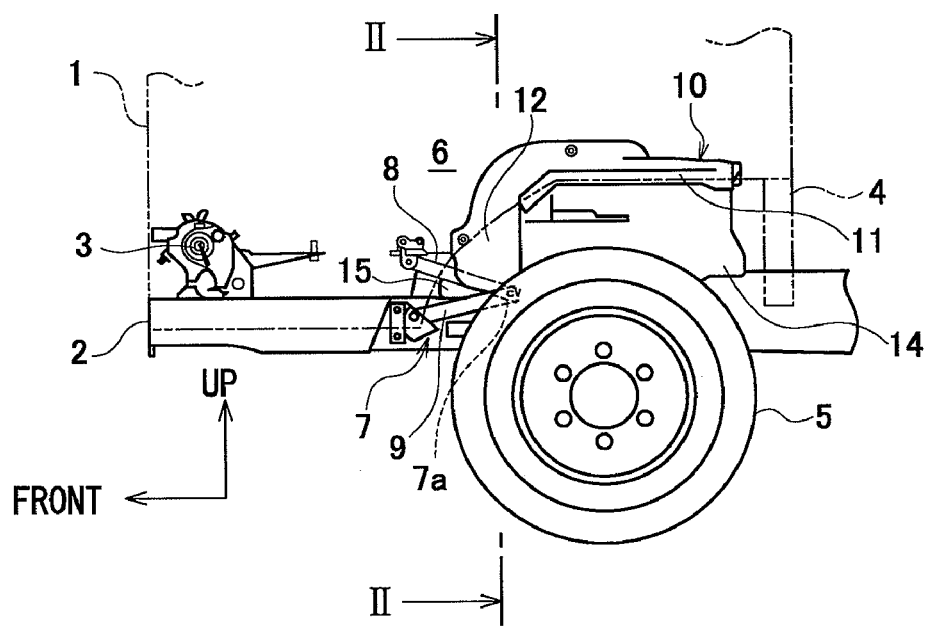
FIG. 1 is a side view showing a sound-insulation structure of an embodiment.

EXPLANATION OF REFERENCE NUMERALS 1 cab
2 side member (chassis frame)
3 tilt axis
4 cab mount
5 front tire
6 engine room
7 tilt stay
7a rear edge portion of tilt stay
10 cab-side cover
11 cab-side rear cover portion
12 cab-side front cover portion
13 chassis-side cover
14 chassis-side rear cover portion
15 chassis-side front cover portion

BEST MODE FOR CARRYING OUT THE INVENTION

An embodiment of the present invention will be described below on the basis of the drawings.

Figure 2:
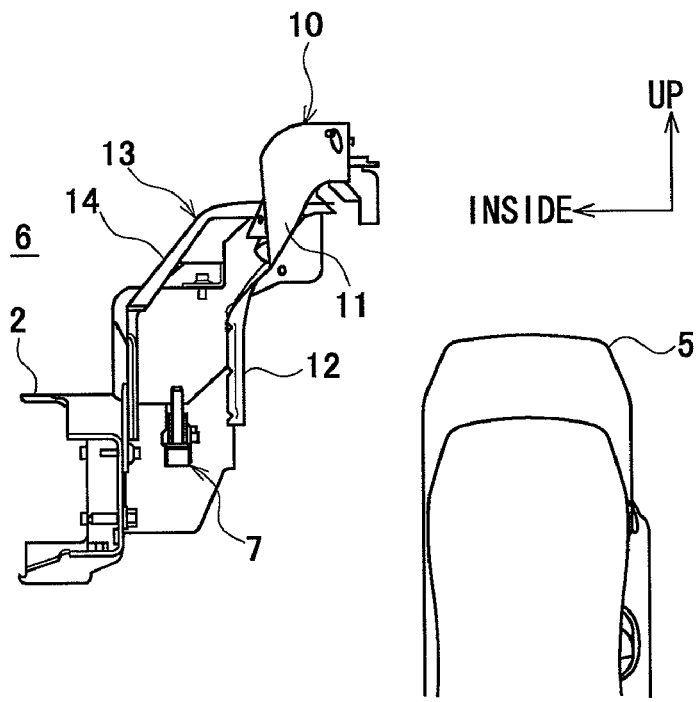
FIG. 2 is a cross-sectional view taken along an arrow II-II of FIG. 1.
Figure 3:
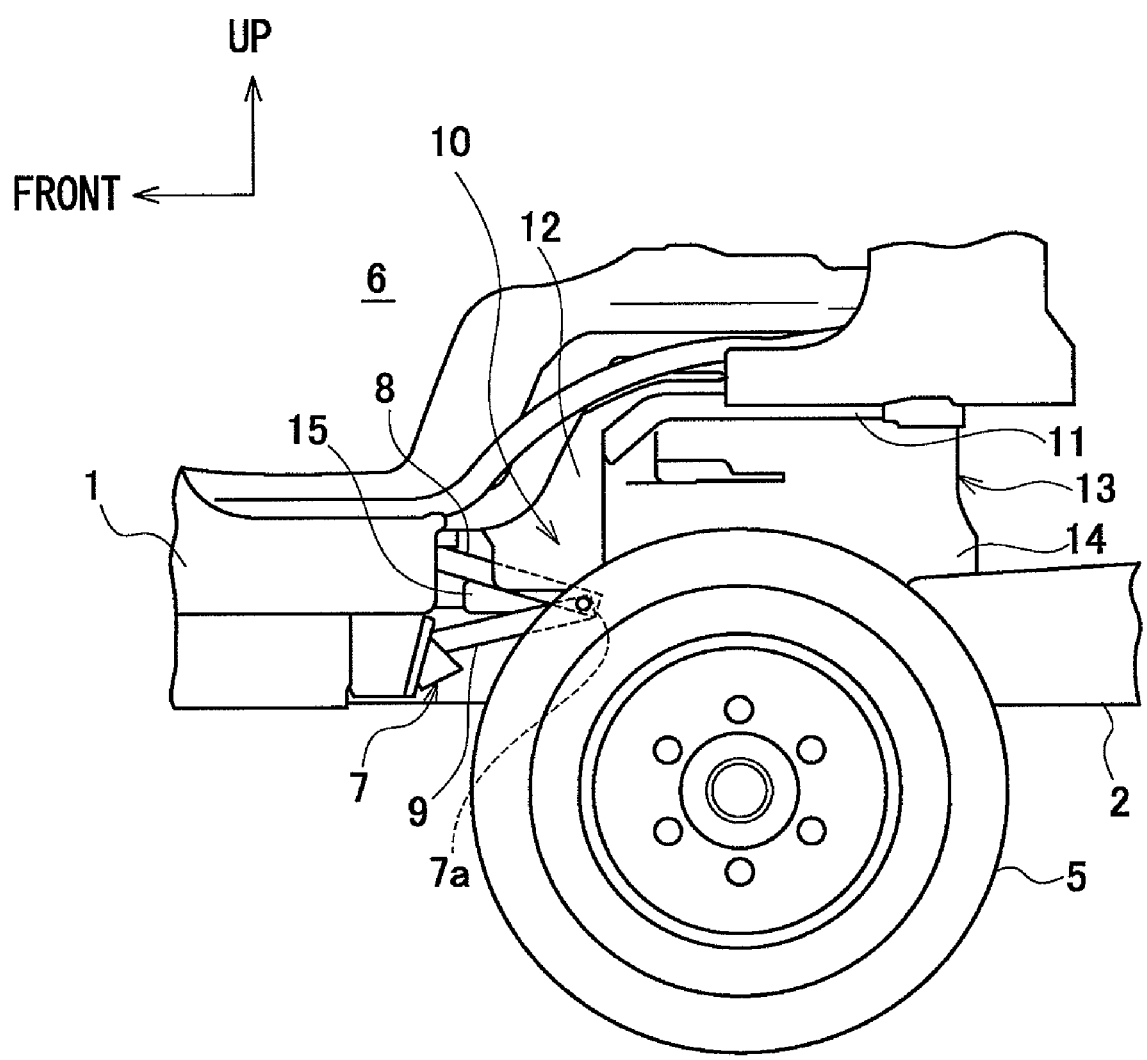
FIG. 3 is an enlarged view showing a main part of FIG. 1.
Figure 4:
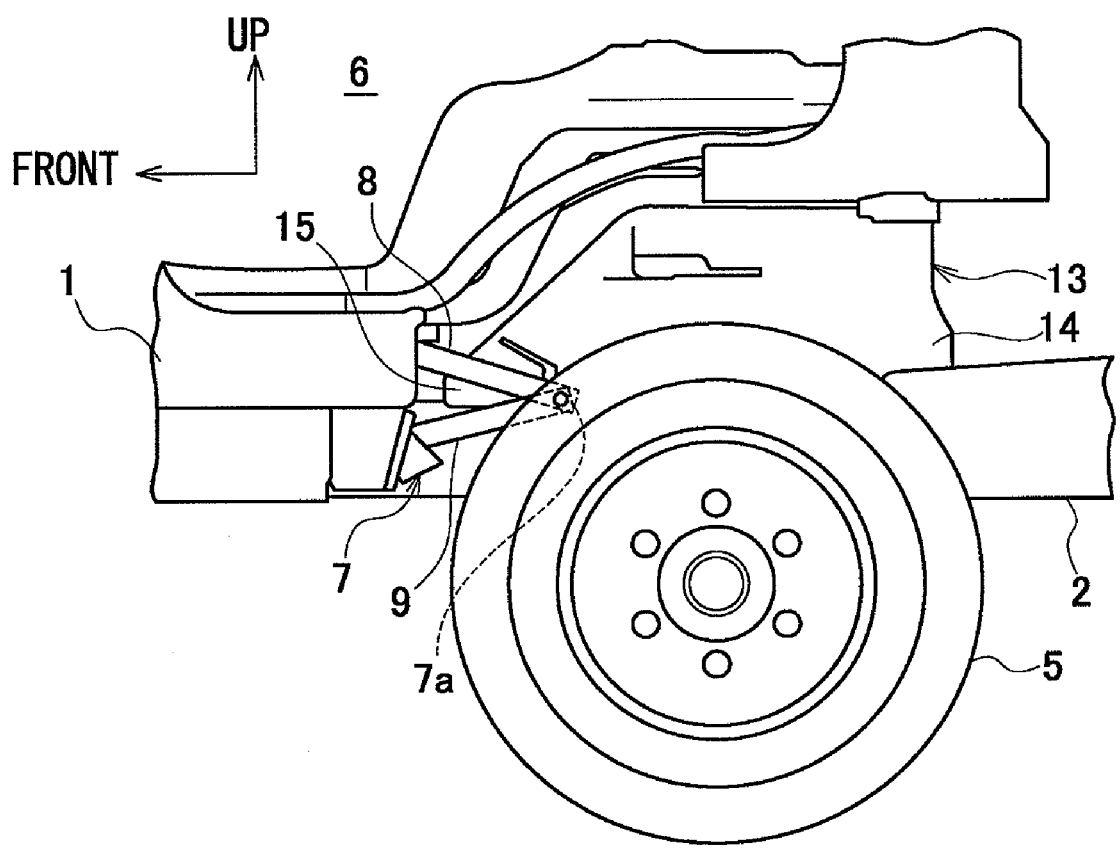
FIG. 4 is a side view showing a state where only a chassis-side cover is attached.
Figure 5:
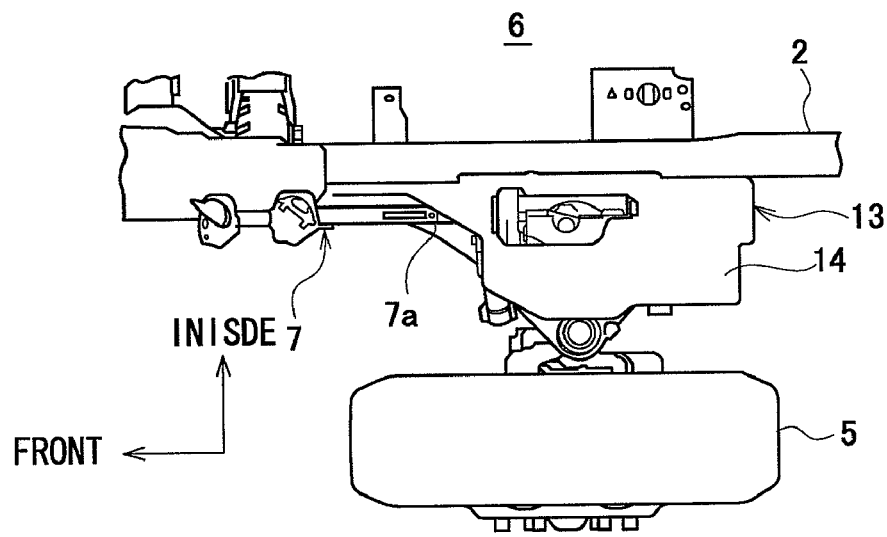
FIG. 5 is a plan view of FIG. 4.
Figure 6:
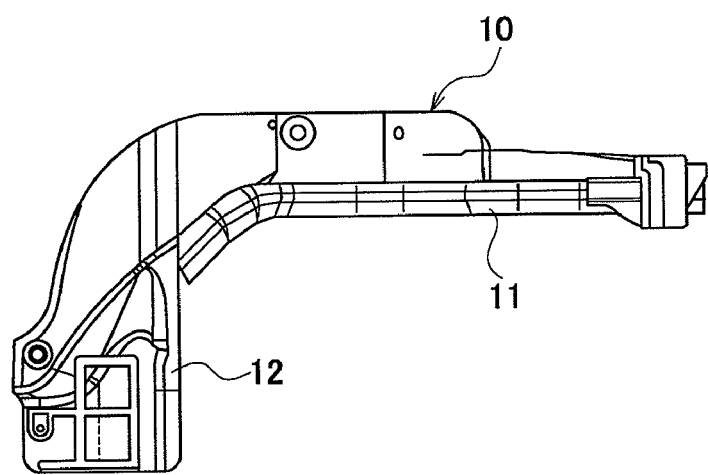
FIG. 6 is a side view of the cab-side cover.
Figure 7:
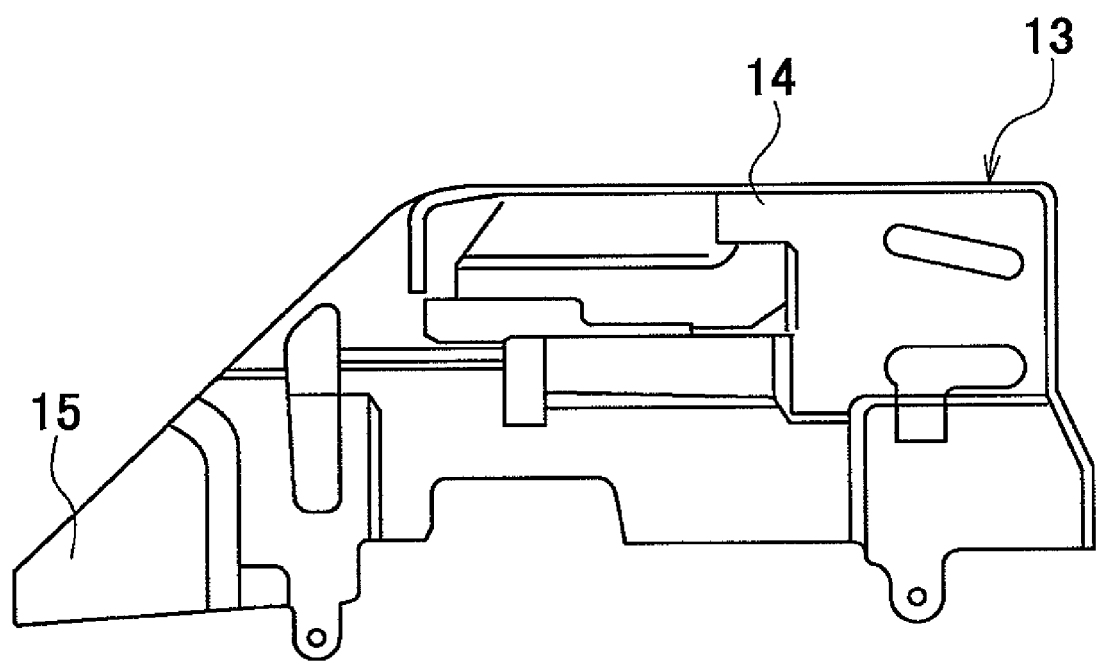
FIG. 7 is a side vies of a chassis-side cover.

FIG. 1 is a side view showing a sound-insulation structure of the embodiment; FIG. 2 is a cross-sectional view taken along an arrow II-II of FIG. 1; FIG. 3 is an enlarged view showing a main part of FIG. 1; FIG. 4 is a side view showing a state where only a chassis-side cover is attached; FIG. 5 is a plan view of FIG. 4; FIG. 6 is a side view of the cab-side cover; FIG. 7 is a side view of a chassis-side cover. Note that, in the drawings, "FRONT" indicates the front side of the vehicle, "UP" indicates the upper side of the vehicle, and "INSIDE" indicates the inner side, in the vehicle-width direction, of the vehicle, respectively. In addition, in the following description, a front-to-rear direction means the front-to-rear direction of the vehicle.

As shown in FIG. 1, the front edge portion of a cab 1 of a cab-over truck is rotatably supported about a tilt axis 3 with respect to side members (chassis frame) 2 each extending in the front-to-rear direction. Cab mounts 4 supporting the rear edge portion of the cab 1 from below are fixed to the side members 2. The cab 1 in a non-tilted state is supported at the front edge portion by the tilt axis 3, and is supported at the rear edge portion by the cab mounts 4. The cab 1 in the non-tilted state is set to a tilted state when the rear edge side thereof is rotated and moved upward about the tilt axis 3.

Front tires 5 of front wheels capable of being steered are arranged at the outer sides, in the vehicle-width direction, of the side members 2. The front tires 5 are each supported by the side member 2. Further, an engine room 6 is defined at the inner side, in the vehicle-width direction, of the side members 2 and below the cab 1 in the non-tilted state.

Tilt stays 7 keeping the cab 1 in the tilted state are arranged at the front side and at the inner side, in the vehicle-width direction, of the front tires 5. Each tilt stay 7 includes an upper link 8 and a lower link 9. One end portion of the upper link 8 is rotatably connected to the cab 1, and one end portion of the lower link 9 is rotatably connected to the outer side surface, in the vehicle-width direction, of the side member 2. The other end portion of the upper link 8 and the other end portion of the lower link 9 are rotatably connected to each other. While the cab 1 is being tilted, the upper link 8 and the lower link 9 get raised to keep the cab 1 in the tilted state. When the cab 1 is shifted from the tilted state to the non-tilted state, the other end portions of the upper link 8 and the lower link 9 move rearward. Specifically, while the cab 1 is in the non-tilted state (while the cab 1 is not being tilted), the other end portions of the upper link 8 and the lower link 9 serve as a rear edge portion 7a of the tilt stay 7, and the rear edge portion 7a is located between the front tire 5 and the side member 2. A position, in the vehicle-width direction, of the tilt stay 7 is set so that the tilt stay 7 may not interfere with the steering range of the front tire 5.

As shown in FIGS. 1 to 7, cab-side covers 10 are attached to portions located at the upper side and at the inner side, in the vehicle-width direction, of the front tires 5.

While the cab 1 is not being tilted, each cab-side cover 10 is arranged, in the front-to-rear direction, in a region located at the inner side, in the vehicle-width direction, of the front tire 5 and at the outer side, in the vehicle-width direction, of the tilt stay 7. The cab-side cover 10 includes a cab-side rear cover portion 11, and a cab-side front cover portion 12 extending forward from the cab-side rear cover portion 11 integrally. The cab-side rear cover portion 11 is arranged in the central portion to the rear portion and at the inner side, in the vehicle-width direction, of the front tire 5; and the cab-side front cover portion 12 is arranged at the front portion and at the inner side, in the vehicle-width direction, of the front tire 5, respectively. The cab-side rear cover portion 11 extends downward and toward the inner side, in the vehicle-width direction, of the cab 1 from the lower edge portion of the cab 1. The cab-side front cover portion 12 extends forward and toward the outer side, in the vehicle-width direction, of the rear edge portion 7a of the tilt stay 7 from the lower edge portion of the cab 1.

Chassis-side covers 13 are attached to outer surfaces, in the vehicle-width direction, of the side members 2, the outer surfaces located at the inner side, in the vehicle-width direction, of the front tires 5.

Each chassis-side cover 13 includes a chassis-side rear cover portion 14 and a chassis-side front cover portion 15 extending forward from the chassis-side rear cover portion 14 integrally. The chassis-side rear cover portion 14 is arranged in the central portion to the rear portion and at the inner side, in the vehicle-width direction, of the front tire 5; and the chassis-side front cover portion 15 is arranged at the front portion and at the inner side, in the vehicle-width direction, of the front tire 5, respectively. The chassis-side rear cover portion 14 extends upward from the upper edge of the outer side surface, in the vehicle-width direction, of the side member 2, then bends, at the upper side of the tilt stay 7, and extends obliquely upward from the outer side, in the vehicle-width direction, of the side member 2. While the cab 1 is not being tilted, the chassis-side front cover portion 15 extends further forward and downward than the front lower edge of the cab-side front cover portion 12 at the inner side, in the vehicle-width direction, of the tilt stay 7. The lower edge fringe of the chassis-side front cover portion 15 is located at the lower side of the upper edge fringe of the outer side surface, in the vehicle-width direction, of the side member 2.

In a state where the cab-over truck is viewed in the vehicle-width direction, the upper edge fringe of the chassis-side cover 13 is located above the lower edge fringe of the cab-side cover 10 during the cab 1 not being tilted. In other words, in the state where the cab-over truck is viewed from the outer side in the vehicle-width direction while the cab 1 is not being tilted, an approximately entire region of a space formed between the cab 1 and the side member 2 is covered with the cab-side cover 10 and the chassis-side cover 13, the space formed at the inner side, in the vehicle-width direction, of the front tire 5.

Further, the cab-side cover 10 (the cab-side rear cover portion 11 and the cab-side front cover portion 12) is arranged at the outer side, in the vehicle-width direction, of the tilt stay 7. Thus, the lower edge fringe of the cab-side cover 10 is set at a height at which the cab-side cover 10 will not interfere with the steering range of the front tire 5 in a state where the cab 1 is located at its lowermost position due to the actuation of a suspension mechanism.

By contrast, a portion, of the chassis-side rear cover portion 14, extending upward from the upper edge fringe of the outer side surface, in the vehicle-width direction, of the side member 2 and the chassis-side front cover portion 15 are arranged at the inner side, in the vehicle-width direction, of the tilt stay 7. The position, in the vehicle-width direction, of the tilt stay 7 is set so that the tilt stay 7 may not interfere with the steering range of the front tire 5. Accordingly, what is needed for the chassis-side rear cover portion 14 is to extend its upper edge fringe, of the portion extending upward from the upper edge fringe of the outer side surface, in the vehicle-width direction, of the side member 2, to a height at which the chassis-side rear cover portion 14 will not interfere with the front tire 5. Meanwhile, interference with the front tire 5 does not need to be considered for the chassis-side front cover portion 15. In other words, a position of the lower fringe of the cab-side front cover portion 12 is restricted by the steering angle of the front tire 5, while a position of the lower fringe of the chassis-side front cover portion 15 is not restricted by the steering angle of the front tire 5.

Hence, the lower edge fringe of the cab-side front cover portion 12 can be extended as long as its position (height) will not interfere with the steering range of the front tire 5. Further, the chassis-side front cover portion 15 can be extended forward as long as its position (front position and height) will not interfere with other in-vehicle parts. Thus, in a region located in the front vicinity of the rear edge portion 7a of the tilt stay 7 during the cab 1 not being tilted, a portion where the cab-side front cover portion 12 and the chassis-side front cover portion 15 overlap each other in the vehicle-width direction can be doubly covered with these cover portions 12 and 15 from the vehicle-width direction; and a portion located further forward and downward than the front lower edge of the cab-side front cover portion 12 can be covered with the chassis-side front cover portion 15 from the outer side thereof in the vehicle-width direction. In essence, the region located in the front vicinity of the rear edge portion 7a of the tilt stay 7 during the cab 1 not being tilted can be covered with the cab-side front cover portion 12 and the chassis-side front cover portion 15 from the outer side thereof in the vehicle-width direction. Thereby, an engine sound can be sufficiently blocked.

It should be noted that the above-described embodiment is an example of the present invention. Thus, it goes without saying that the present invention is not limited to the above-described embodiment, and that various modifications even other than the above-described embodiment can be made without departing from the technical scope of the present invention.

INDUSTRIAL APPLICABILITY

The present invention is applicable to a sound-insulation structure for a cab-over truck including a cab capable of being tilted.

The invention claimed is:

1. A sound-insulation structure for a cab-over truck, comprising:
    a chassis frame extending in a front-to-rear direction of a vehicle;
    a front tire arranged at an outer side, in a vehicle-width direction, of the chassis frame;
    a cab capable of being set to a non-tilted state where a front edge side and a different edge side thereof are supported by the chassis frame, and to a tilted state where the different edge side is rotated and moved upward about the front edge side;
    a tilt stay keeping the cab in the tilted state;
    an engine room arranged at an inner side, in the vehicle-width direction, of the chassis frame and below the cab in the non-tilted state;
    a cab-side cover fixed to the cab; and
    a chassis-side cover fixed to the chassis frame, wherein
    a rear edge portion of the tilt stay is located between the front tire and the chassis frame while the cab is in the non-tilted state,
    the cab-side cover includes a cab-side front cover portion located at an outer side, in the vehicle-width direction, of the tilt stay and extending further forward than the rear edge portion of the tilt stay while the cab is in the non-tilted state, and
    the chassis-side cover includes a chassis-side front cover portion located at an inner side, in the vehicle-width direction, of the tilt stay and extending further forward and downward than a front lower edge of the cab-side front cover portion while the cab is in the non-tilted state.

* * * * *